April 7, 1925.
G. CAPPI
BAKING AND COOKING UTENSIL
Filed Aug. 16, 1924
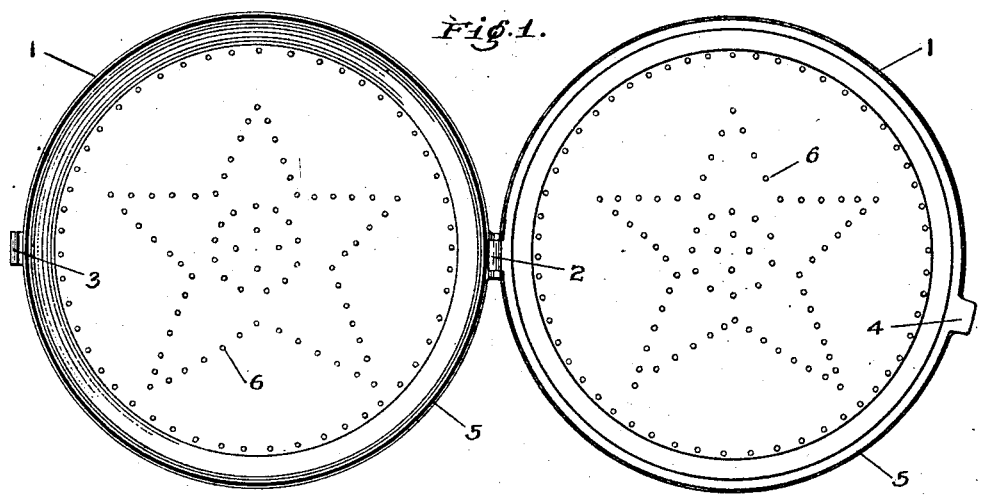
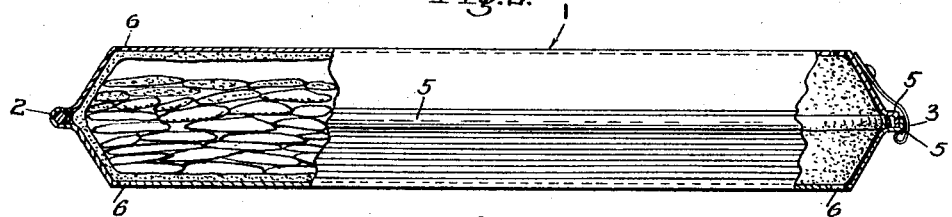
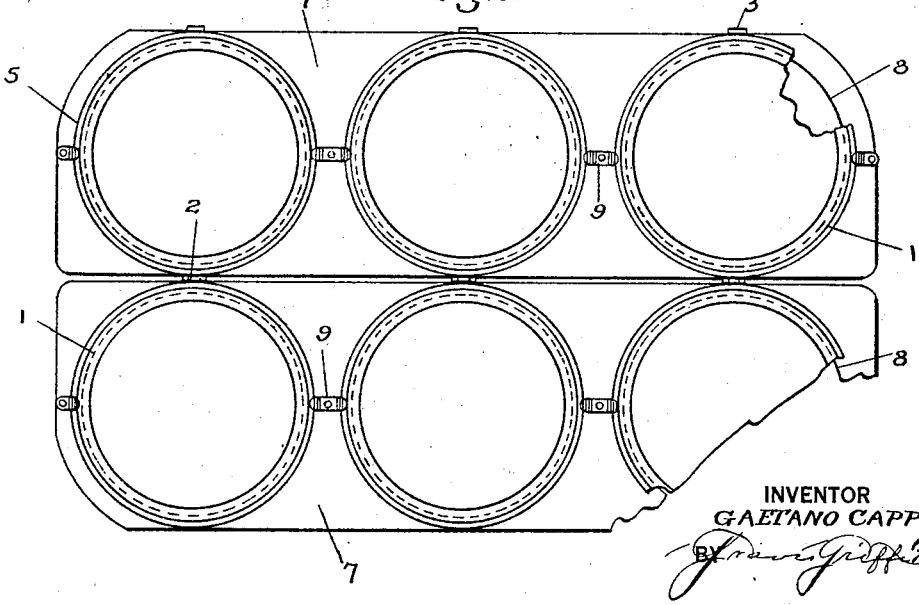
INVENTOR
GAETANO CAPPI
ATTORNEY Patented Apr. 7, 1925.

1,532,881

UNITED STATES PATENT OFFICE.

GAETANO CAPPI, OF SAN FRANCISCO, CALIFORNIA.

BAKING AND COOKING UTENSIL.

Application filed August 16, 1924. Serial No. 732,440.

*To all whom it may concern:*

Be it known that I, GAETANO CAPPI, a citizen of the United States, and a resident of the city and county of San Francisco and State of California, have invented certain new and useful Improvements in Baking and Cooking Utensils, of which the following is a specification.

The present invention relates to improvements in baking and cooking utensils, and more particularly to those of bivalvular character, the two lateral valves of the shell being hinged and serving as molds for forming containers of pie dough, paste or batter to be filled with fruits, vegetables or meats, the shell and contents being thereafter baked or cooked in the ordinary manner.

Primarily, the object of my invention is to provide hinged molds wherein crust-forming materials, such as doughs, batters and pastes, may be molded into forms for receiving "fillers" of any desired edibles, the molds being thereafter closed and serving as protective containers for their contents during the baking or cooking process, thereby conserving, or causing to be retained, in great measure, juices and flavors that otherwise, if unconfined, would escape.

A further object is the provision of self-contained means for automatically trimming the molded crust-forming material upon closure of the hinged molds.

Additional to the foregoing is the provision of perforated design patterns carried as ornamental features by the molds and affording relief vents wherethrough heated vapors may escape.

Other objects will become apparent as this specification progresses, and be more fully set forth in the claim hereto appended.

Obviously, as implied, the applications of a utensil of this character to the culinary art are many and varied, as, for instance, the following will attest: It is particularly well adapted for molding and retaining for baking alternate layers of spaghetti and grated cheese with such condiments as are necessary to render these more appetizing; or for molding and retaining for baking so called dry pastes forming envelops for the constituent elements and condiments entering into enchiladas, tamales and the like, or for condimented preparations of raviolas, noodles, macaroni and vermicelli; or for first molding and then baking open crusts for pre-prepared "fillers," such as those used in custards and tarts; or for molding and retaining top and bottom dough coverings for baking whose "fillers" may be either pre-cooked or uncooked and consist of fruits, meats, vegetables, mince-meats, or other edible substances; or containing molds in which dumplings and puddings may be cooked; or for baking means in which apples or potatoes may be baked.

In the accompanying drawings, forming a part of this specification, and in which similar characters of reference refer to like parts, throughout,—

Figure 1 is a plan view of the interior of a pair of hinged molds;

Figure 2 is an edge view, with sections broken away, disclosing a portion of pie or other edible in place, and an interior section in elevation; and Figure 3 is a plan view, showing a battery of hinged molds in a carrier member and the means whereby they are secured in place.

Referring more particularly to the drawings, 1 represents the individual members constituting a pair of hinged molds; 2 the hinge connecting these members; 3 a spring catch for retaining in closed relation the hinged molds; 4 a thumb projection borne by the lower member to facilitate separation of the molds preliminary to the removal of contents; 5 offset flanged peripheral lips borne by both members and adapted to fit one within the other, whereby the edges of the crust-forming material is shorn, or trimmed, upon bringing the two members into closed relationship; 6 perforated design patterns borne by the molds; 7 frames bearing openings 8 for the carriage, in batteries, of the hinged molds, and 9 buttons adapted to secure in place the respective hinged molds.

Having thus described my invention, I claim, and desire to secure by Letters Patent:

A baking utensil comprising a pair of comparatively shallow, perforated hinged pastry pans adapted to form a crust forming mold, said pans each bearing offset peripheral lips adapted to fit one within the other to serve as shearing edges when brought into closed relationship, to shear off, or trim, the outer edge of the contents, thereby forming a bead around the molded contents of the mold, and retaining means adapted to maintain said hinged pans in closed relationship.

GAETANO CAPPI.